May 28, 1957  I. KALIKOW ET AL  2,794,136

GENERATOR WARNING SIGNAL

Filed Nov. 30, 1955

Inventors:
Irving Kalikow,
John T. Bateman,
by
Their Attorney.

2,794,136

GENERATOR WARNING SIGNAL

Irving Kalikow, Swampscott, and John T. Bateman, Marblehead, Mass., assignors to General Electric Company, a corporation of New York Application November 30, 1955, Serial No. 550,090

4 Claims. (Cl. 310—68)

The invention described herein relates to dynamoelectric machine signaling systems and more particularly to a generator warning device used for indicating mechanical failure of a generator and has for its object the provision of an inexpensive and reliable device easily installed in a stator for warning an operator of impending damage thereto.

It is well known in the art to provide a dynamoelectric machine with a thermal protective device for opening a circuit to the machine when the operating temperature rises to a predetermined high value. In the event of mechanical failure of the operating parts however, such as worn bearings which permit the rotor to physically engage the stator, the thermal protective device is not effective to stop operation of the machine since its location is usually remote from the source of trouble, and is therefore incapable of responding to the high temperature developed by the rotor when it rubs against the stator. As a result, the machines are usually severely damaged before the mechanical failure is detected.

In carrying out our invention we provide a device designed for insertion in a dynamoelectric machine, such as a generator, and being arranged in the manner of a normally open switch so as to have the switch respond to and detect any mechanical failure which will permit the rotor to rub or otherwise engage the fixed stator. When the stator is engaged by the rotor for any reason, the device becomes operative to close an alarm circuit for audibly or visually showing that damage to the generator is imminent.

For a more complete understanding of the invention, as will be hereinafter more particularly pointed out in the appended claims, reference is now made to the following description taken in connection with the accompanying drawings in which:

Figure 1:
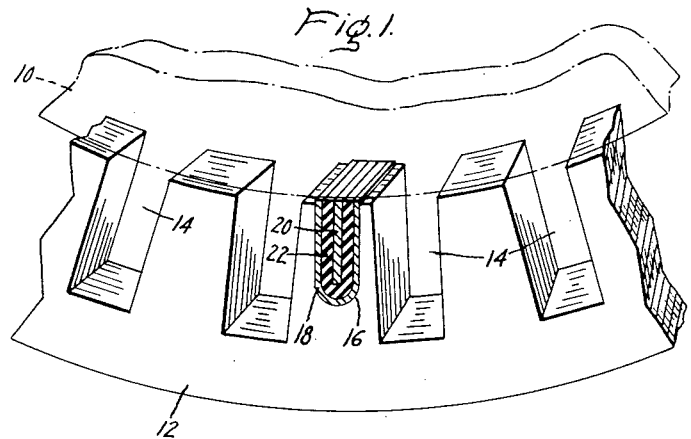
Figure 1 is a view in elevation, partly in section, illustrating a protective device arranged in a slot fixed in the stator of a generator.

Referring now to the drawings wherein like reference characters designate like or corresponding parts throughout the several views, there is shown in Figure 1 a rotor 10 mounted for rotation in spaced relationship with a stator 12 having slots 14 formed in the stator for receiving conductors, not shown, necessary for the proper operation of the machine. An additional slot 16 is formed in a tooth separating slots 14 and is arranged to extend the length of the stator.

The device utilized for obtaining actuation of a warning alarm is positioned within slot 16 and comprises a normally open switch consisting of a U-shaped metal channel 18 extending the length of the stator and of a size sufficient to form a snug fit with the walls of slot 16. A rectangular bar 20, made of copper or other soft conducting material, is positioned within the U-shaped channel 18 but is spaced therefrom by insulating material 22. As shown in this figure, the U-shaped channel 18, copper bar 20 and insulation 22 are all arranged to extend the length of slot 16 and to project a slight amount above the stator tooth so that they will be contacted by the rotor before it engages the stator teeth.

The U-shaped member is preferably made of iron in order to minimize the restriction of flux through the stator tooth and the insulation 22 must be compatible with the operating temperatures of the machine. The soft material of the copper bar 20 is selected in order to have it easily smear or deform when contacted by the rotor and thereby bridge the gap to the U-shaped channel 18. A coat of varnish applied to the exposed face of the device prevents accidental grounding caused by carbon dust, fine particles of metal or other foreign material which usually filters into the air gap in the machine.

Figure 3:
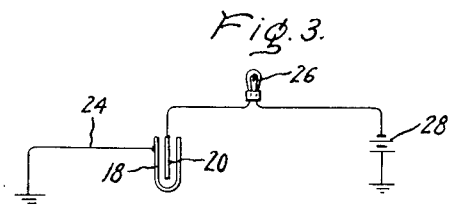
Figure 3 is a schematic showing of an electrical system utilized in sounding an alarm when the device is made operative.

As shown in Figure 3, the U-shaped channel 18 is grounded through conductor 24 while the copper bar 20 is serially conencteed through a lamp, horn, buzzer or other indicating device 26 and a suitable source of power 28, such as a battery.

Figure 2:
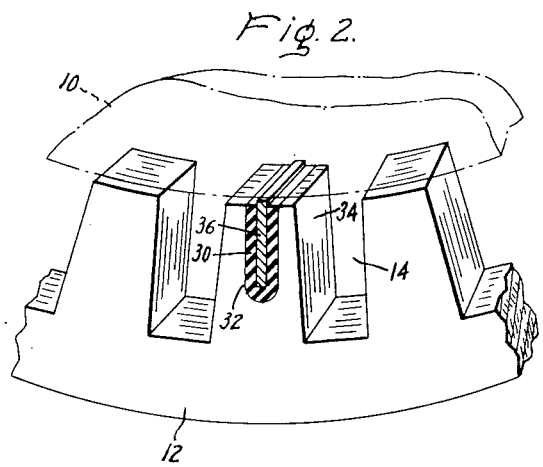
Figure 2 is a modification of the device shown in Figure 1.

The modification illustrated in Figure 2 is substantially the same as that shown in Figure 1 except that the U-shaped member has been omitted from the device. The device comprises insulation 30 positioned within a slot 32 formed or otherwise provided in a tooth 34 in the stator. A copper bar 36 is driven into the insulation and is arranged to protrude a slight amount above the surface of the tooth so as to be contacted by the rotor before the rotor engages the stator when a defect occurs to the operating parts of the machine. In this modification, the source of power is grounded to the machine and the circuit through the alarm is closed when the copper in bar 36 is smeared on to the face of tooth 34 which is at ground potential.

It is preferable in both modifications that the device span the entire face of the stator in order to detect a bearing failure at either end of the machine, although it is within the scope of this invention to locate the device separately at both ends or at any position therebetween. Also, although the preferred location is at or near the bottom of the stator, so as to take advantage of the action of gravity in actuating the indicator, tests have shown that there is sufficient movement of the armature transverse to the longitudinal axis of the machine to cause the copper to smear when the device is placed at any peripheral position, even at the top of the stator. Further, it is not necessary that the device extend above the face of the stator teeth, although this is preferable, since the rubbing action of the rotor on the stator is so widespread when there is a bearing failure that the copper would be caused to smear if the device were placed flush with the stator internal face.

*Operation*

In operation, the device acts as a normally open electrical switch in which insulation 22 isolates copper bar 20 from the U-shaped channel 18 which is at ground potential. When the machine bearings become worn, or other defect occurs, the rotor slowly closes the air gap until copper bar 20 is contacted by the rotor. This contact causes the soft copper to smear to an extent where it bridges the insulation and engages channel member 18, or the top of a stator tooth in the modification of Figure 2, thereby closing the circuit shown in Figure 3 to initiate actuation of the alarm. The alarm will remain energized until the copper is cleaned from the surface of the device.

Obviously, many modifications and variations of the present invention are possible in light of the above teachings. It is therefore to be understood that within the scope of the appended claims the invention may be practiced otherwise than as specifically described.

What we claim as new and desire to secure by Letters Patent of the United States is:

1. A dynamoelectric machine comprising a rotor positioned for rotation within a stator provided in said machine, a slot provided in a stator tooth and arranged to extend the length of said stator, electrical means positioned within and extending the length of said slot and being arranged to enable said rotor to contact said electrical means when a defect occurs in said machine, and an alarm connected with said electrical means for indicating impending contact of said stator by said rotor.

2. A dynamoelectric machine comprising a stator and a rotor arranged for electrodynamic cooperation, a slot formed on the inner peripheral surface of said stator for receiving a switch comprising a metallic bar of soft deformable material having one end extending into the air gap between said rotor and stator, insulation means between said stator and bar for electrically isolating the stator and bar from each other, electrical power means including an alarm indicating device connected in circuit with said bar and stator so that upon reduction in size of the air gap caused by a defect in the machine, said rotor engages said bar and smears the exposed portion thereof across the insulation and into permanent engagement with said stator, whereby a circuit including the power means and alarm is caused to be permanently energized for warning an operator of impending damage to the machine.

3. The combination according to claim 2 wherein said switch comprises a U-shaped element snugly fitted within said slot, a metallic member positioned within said U-shaped element and spaced therefrom by insulating material, said elements being arranged to extend a distance above the normally curved surface of said stator thereby enabling said rotor to engage one of said elements and cause it to bridge the other upon the occurrence of a mechanical defect in said machine.

4. A dynamoelectric machine comprising a stator and a rotor arranged for electrodynamic cooperation therewith, a slot formed in the face of a tooth in said stator and arranged to extend the length thereof, a metallic bar in said slot extending above the tooth face and insulation electrically isolating said bar from said tooth, and electrical power means including an alarm indicating device connected in circuit with said bar and tooth so that upon the happening of a defect in said machine, said rotor causes said bar to contact said tooth thereby closing said circuit for energizing said alarm indicating device.

References Cited in the file of this patent
UNITED STATES PATENTS

| | | |
|---|---|---|
| 568,608 | Gibbs | Sept. 29, 1896 |
| 893,865 | Ormiston et al. | July 21, 1908 |
| 1,492,022 | Eddy | Apr. 29, 1924 |